United States Patent
Paetow

[11] 3,737,827
[45] June 5, 1973

[54] CREEP-COMPENSATING STRAIN GAGES

[75] Inventor: Jürgen Paetow, 61 Darmstadt, Germany

[73] Assignee: Hottinger Baldwin Messtechnik GmbH, Darmstadt, Germany

[22] Filed: Oct. 12, 1971

[21] Appl. No.: 188,305

[30] Foreign Application Priority Data

Oct. 10, 1970 Germany..................P 20 49 820.8

[52] U.S. Cl. ............................................338/2
[51] Int. Cl. ...........................................G01l 1/22
[58] Field of Search ...............................338/2–6; 73/88.5 R, 88.5 SP, 358 AR

[56] References Cited

UNITED STATES PATENTS

| | | | |
|---|---|---|---|
| 2,885,524 | 5/1959 | Eisler | 338/2 X |
| 2,415,082 | 2/1947 | Burr | 338/2 |
| 2,739,212 | 3/1956 | Wooley et al. | 338/2 X |

Primary Examiner—C. L. Albritton
Attorney—James E. Mrose and Mary C. Thomson et al.

[57] ABSTRACT

Creep effects exhibited by elastically deformable load sensing members equipped with foil-type resistive strain gages are counteracted by way of strain gage constructions in which a plurality of relatively short end-to-end grids, including a multiplicity of end tabs, develop compensatory inversely varying electrical output characteristics due to slippage.

12 Claims, 4 Drawing Figures

Patented June 5, 1973

3,737,827

Inventor:
Jürgen Paetow,
by James E. Mrose
Attorney

CREEP-COMPENSATING STRAIN GAGES

BACKGROUND OF THE INVENTION

A problem of long standing in the strain gage transducer art has been that of so-called "creep" in the elastically deformable materials (example: certain steels) of which the sensing elements of such transducers are made. Whether the sensing elements are in the form of columns, beams, diaphragms shafts, or other linear, radial or angular force-translating configurations, these unwanted effects are fundamentally the same, namely that the elastically deformable material tends to exhibit somewhat sustained deformation in the course of time under prolonged stress conditions. Likewise, similar creep occurs in the backings, adhesive bonds, and filaments of conventional resistance-type strain gages which may be applied to the underlying sensing elements undergoing stress, and, together, these effects may be characterized as the material creep in a gaged structure.

When the underlying sensing element is subjected to stress of loading, the electrical output promoted by an associated strain gage bridge tends to be relatively high at first, and then to decrease to a lower level as the loading persists; and, when the loading is suddenly removed, the bridge output tends to go negative and then to drift slowly back toward the expected zero. Seemingly, these varying erroneous output characteristics are of the wrong sense, because the aforesaid material creep would, by itself, dictate the opposite behavior wherein the output would rise gradually to a predetermined level when load is applied and would decrease gradually toward zero when load is removed. The differences appear to be accounted for by a collateral phenomenon which is essentially a "slip" of the strain-gage filaments in relation to the bonding material, such as adhesive, plastic or other material which is intended to secure these filaments in fixed relation to the underlying elastically deformable material of the sensing element to which the strain gage unit is attached. This slipping action is especially prominent at the ends of the elongated filaments, where it is known that the shear stress is particularly high because of the abruptness of material changes. The end tabs or interconnections between adjacent filaments in a strain-gage grid are disposed at these positions of high shear stress, of course, but there can be significant slippage despite the locking actions of these tabs.

Effects of the aforementioned slippage upon electrical output of a gage are the reverse of the effects induced by material creep, and, in the case of wire gages, the minute end tabs tend to slip so significantly that the slip influences predominate and the net electrical output variations of the assembly are as described above. The situation involving foil-type gages is somewhat different, in that the flat end tabs or interconnections between adjacent flat filaments are of relatively broad area and tend to slip relatively little. Consequently, the effects of material creep predominate, and the net electrical outputs experienced with foil gages tend to rise gradually to a predetermined level when load is applied and to decrease gradually toward zero when load is removed. It is to the compensation of these effects of material creep that the present invention is particularly directed, with a principal objective being to yield a net electrical output characteristic in which neither slip nor creep variations will predominate and in which, instead, the output will at once rise to and remain at a fixed level when a predetermined load is applied and will at once decrease to and remain at substantially zero level when the load is suddenly removed.

SUMMARY

The present invention is aimed at creating improved strain-gage installations in which compensations for net electrical output variations due to material creep effects are developed by way of unique grid configurations of the gage filaments.

Based upon distinctive recognitions that shear stresses in a resistance-type strain gage are a maximum at locations of discontinuities in the filaments along the direction of strains to be measured, and that the effects of gage filament slippages will be enhanced by numerous such discontinuities in relation to the overall lengths and resistances of the filaments, gages are formed with numerous short-length filaments having locking elements, such as end tabs, disposed at maximum-shear-stress positions at the sites of the discontinuities.

By way of a summary account of practice of this invention in one of its aspects, numerous relatively short filaments of a foil-type resistance strain gage are disposed in spaced end-to-end relationship in alignment with direction of strains to be measured, the short filaments being subdivided into serially-connected grid arrays. For uses where the stress gradient in the underlying sensing element is non-uniform, as in the case of the side of a hole in such an element, numerous end tabs for the short filaments are advantageously disposed at the locus of peaked stress. Electrical connections providing alternate points for electrical tapping of the gage outputs, to selectively include or exclude one or more auxiliary grids which exhibit desired slip, afford convenient in situs adjustment of creep compensation of a gage installation.

DESCRIPTION OF THE PREFERRED EMBODIMENTS

Figure 1:
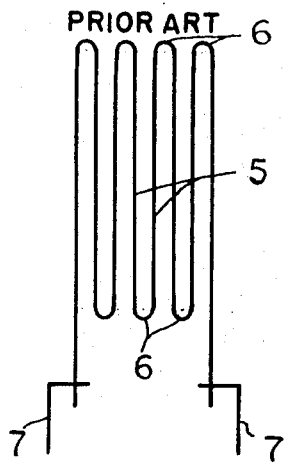
FIG. 1 depicts a prior-art resistance-type strain gage filament array.

The strain gage pattern appearing in FIG. 1 is typical of that of a conventional resistance type wire or foil gage, the usual backing material, such as plastic, and adhesive bonding material and underlying sensing element not being illustrated. Classically, the elongated filaments, 5, are substantially parallel and are connected electrically in series into a single grid by way of end tabs or connections 6. Electrical connections 7 for the ends of the serially connected filaments are shown schematically. It will of course be understood that the end tabs and end connections are normally enlarged and of relatively broad area when the gage is of a foil type, although not so shown in the drawing. Such gages are customarily aligned so that the filaments are substantially parallel with the direction of strain to be exhibited by the underlying sensing element. In many instances there is no gradient of stress appearing from one end of the gage to the other, and, in other cases, such as those wherein the gage is bonded along the curved interior of a sensing element having an accommodating hole, the stress gradient may be non-uniform and peaked about midway along the length of the gage filaments.

Figure 2:
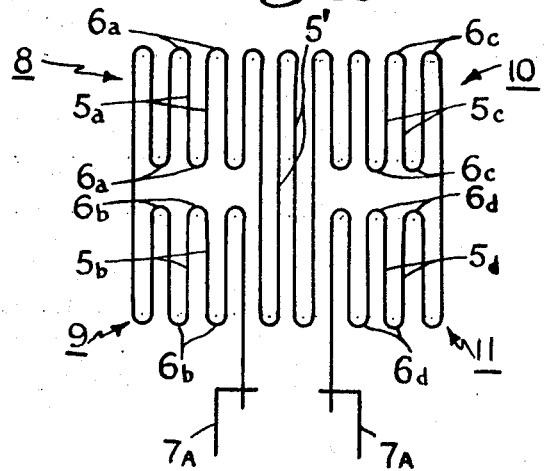
FIG. 2 illustrates the filament array of an improved creep-compensating gage part of which is subdivided into numerous short-length end-to-end grids.

For reasons already discussed hereinabove, the filaments of a general counterpart of the FIG. 1 gage appearing in FIG. 2 are at least in part made up of shorter-length filaments $5a$, $5b$, $5c$ and $5d$, these being disposed in smaller co-planar grid subdivisions 8, 9, 10 and 11, respectively, symmetrically alongside the longer centrally disposed filaments $5'$. Preferably, the conductive portions of the gage are of foil form, whether mechanically or electrochemically created, and the end tabs or interconnections $6'$, $6a$, $6b$, $6c$ and $6d$ are therefore of relatively broad area. As was explained hereinabove, these end tabs are disposed at end positions where maximum shear stress is developed in the gage unit itself, and this is also true at those positions where the longitudinally spaced end tabs $6a$ and $6b$ confront one another. The latter positions are sites of maximum shear stress because of the discontinuities resulting from the longitudinal spacing between the confronting end tabs. Each of the shorter-length filaments is less than half the length of the length of filaments $5'$, the latter being what would normally be selected for the filament length for a particular gage installation. Consequently, the creep-compensating slippages in the short-length grid subdivisions 8–11 are larger in relation to the filament resistances involved than would be the case with longer filaments, such as filaments all the same length as filaments $5'$. Electrical connections 7A serve the same function as connections 7 in FIG. 1.

Figure 3:
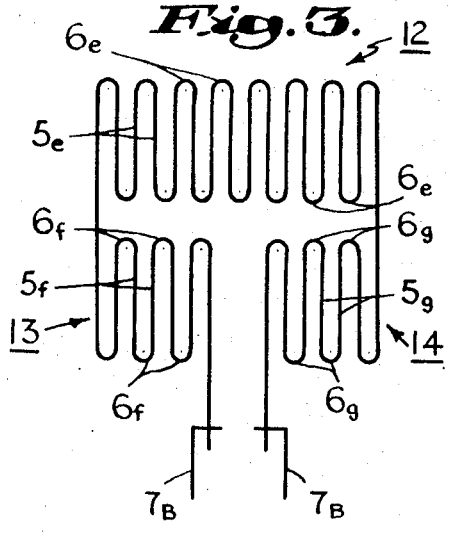
FIG. 3 represents a modification of the array of FIG. 2, in which all of the filaments are of relatively short length.

In FIG. 3, the gage pattern involves only short-length filaments, to maximize the aforementioned creep-compensating effects. There, the wider short-length grid subdivision 12, involving filaments $5e$ and end tabs $6e$ is longitudinally spaced a short distance from like-length narrower grid subdivisions 13, involving filaments $5f$ and end tabs $6f$, and grid subdivision 14, involving filaments $5g$ and $6g$. Connections 7B are functionally like 7 and 7A.

Figure 4:
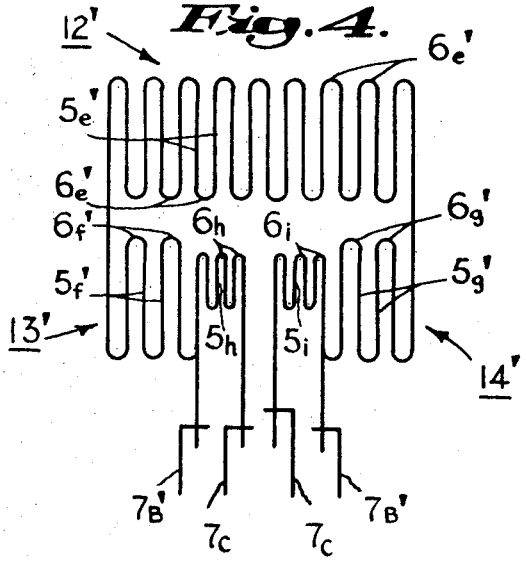
FIG. 4 portrays a modification of the grid arrangement of FIG. 3 in which further grids of even shorter length are serially added, together with alternate electrical connections, the added grids providing means for adjusting overall creep compensation.

The gage arrangement in FIG. 4 corresponds in part to that in FIG. 3, and like portions thereof are correspondingly numbered, with distinguishing single-prime accents applied. However, two further grid subdivisions, 15 and 16, are added electrically in series with the terminal ends of grid subdivisions $13'$ and $14'$, respectively. These further grid subdivisions involve only relatively short filaments, $5h$ and $5i$, respectively, with end tabs $6h$ and $6i$ spaced in the direction of the strain displacements to be measured. Therefore, both of these further grid subdivisions exhibit significant slip effects in relation to possible changes in resistance due to strain, and afford a means for electrically modifying the overall creep-compensating effects of the gage unit after it has been assembled with a sensing element; one such form of manufactured gage may also serve the needs of several different applications for such a gage. For the latter purposes, auxiliary electrical end connections 7C are provided, and the user may thereby select an optimum series electrical combination of the grid subdivisions by making terminal connections with appropriate ones of connections $7B'$ and 7C.

The gages shown in FIGS. 2–4 are all provided with extra end tabs about midway of their overall lengths, and will therefore develop optimum compensatory effects when responding to the aforementioned non-uniform gradients of stresses peaking at about that mid location. In other arrangements, the end tabs may be disposed other than midway, of course, and the grid subdivisions may be other than symmetrical.

What I claim as new and desire to secure by Letters Patent of the United States is:

1. A resistance-type filamentary strain gage for the compensation of effects of material creep, comprising a unitary assembly of a plurality of substantially coplanar grid portions each including a plurality of substantially parallel filaments serially interconnected by end tabs, at least some of the filaments of different ones of said grid portions being in end-to-end relationship with respective confronting end tabs thereof spaced from one another, electrical terminals for said assembly, and means electrically connecting said grid portions in series between two of said electrical terminals.

2. A resistance-type filamentary strain gage as set forth in claim 1 wherein said filaments and end tabs comprise substantially flat foil, said end tabs being enlarged in area in relation to said filaments, and wherein said filaments are substantially aligned with the direction of strain to be measured by said assembly.

3. A resistance-type filamentary strain gage as set forth in claim 2 wherein each of said grid portions comprises an array of substantially equal-length foil filaments forming a substantially rectangular pattern, and wherein the assembly of said grid portions forms a substantially rectangular pattern.

4. A resistance-type filamentary strain gage as set forth in claim 2 further comprising at least one additional grid portion connected in series with one of said two electrical terminals and a third one of said electrical terminals.

5. A resistance-type filamentary strain gage as set forth in claim 4 wherein said additional grid portion includes foil filaments of shorter length than the filaments of said grid portions.

6. A resistance-type filamentary strain gage as set forth in claim 4 wherein end tabs connecting adjacent ones of the filaments along one end of said additional grid portion are disposed at a position where substantially the highest stress concentrations are to be developed in a sensing element to which the gage is designed to be applied.

7. A resistance-type filamentary strain gage as set forth in claim 3 wherein said confronting end tabs are disposed at a position where substantially the highest stress concentrations are to be developed in a sensing element to which the gage is designed to be applied.

8. A resistance-type filamentary strain gage as set forth in claim 3 wherein said confronting end tabs are disposed substantially midway along the length of the assembly in the strain-sensing direction.

9. A resistance-type filamentary strain gage as set forth in claim 3 wherein said grid portions are disposed symmetrically about a mid position aligned with said direction of strain.

10. A resistance-type filamentary strain gage for the compensation of effects of material creep, comprising a unitary assembly of a bonding material and a plurality of substantially coplanar filaments, at least some of said filaments being in substantially end-to-end relationships with longitudinal spacing therebetween, end tabs at the ends of the end-to-end filaments which are more remote from said longitudinal spacing and serially interconnecting adjacent ends thereof, and means electrically connecting ends of said filaments at the site of said longitudinal spacing while at the same time anchoring said ends with said bonding material, electrical terminals for said assembly, and means electrically connecting the interconnected filaments in series between two of said electrical terminals.

11. A resistance-type filamentary strain gage as set forth in claim 10 wherein said filaments and end tabs and connecting means comprise substantially flat foil, and wherein said filaments are substantially aligned with the direction of strain to be measured by said assembly.

12. A resistance-type filamentary strain gage for the compensation of effects of material creep, comprising a unitary assembly of a first substantially parallel group of foil filaments and at least one further group of substantially parallel foil filaments, said foil filaments of said further group being less than about half the length of the filaments of said first group and being substantially parallel therewith, electrical terminals for said assembly, end tabs connecting adjacent ends of said filaments, and means electrically connecting all of said filaments in series between two of said electrical terminals.

* * * * *